United States Patent [19]

Noda et al.

[11] Patent Number: 4,871,991
[45] Date of Patent: Oct. 3, 1989

[54] HORN FOR AN AUTOMOTIVE VEHICLE

[75] Inventors: Kazushi Noda, Ichinomiya; Makoto Kanai, Kani, both of Japan

[73] Assignee: Toyoda Gosei Co., Ltd., Nishikasugai, Japan

[21] Appl. No.: 187,248

[22] Filed: Apr. 28, 1988

[30] Foreign Application Priority Data

Apr. 30, 1987 [JP] Japan ................................. 62-65350
Aug. 6, 1987 [JP] Japan ................................ 62-120925

[51] Int. Cl.$^4$ .................................................. B60Q 5/00
[52] U.S. Cl. ............................... 340/384 E; 340/425.5
[58] Field of Search ............... 340/384 E, 22, 384 R, 340/425.5; 116/59; 307/10 R, 10.1

[56] References Cited

U.S. PATENT DOCUMENTS

| | | | |
|---|---|---|---|
| 3,670,174 | 6/1972 | Sakakibara | 307/10 R |
| 4,438,425 | 3/1984 | Tsuchida et al. | 340/22 X |
| 4,486,742 | 12/1984 | Kudo et al. | 340/384 E |
| 4,532,432 | 7/1985 | Mizuno et al. | 340/22 X |

FOREIGN PATENT DOCUMENTS

| | | |
|---|---|---|
| 3138068 | 7/1982 | Fed. Rep. of Germany . |
| 3420988 | 12/1985 | Fed. Rep. of Germany . |
| 0079725 | 6/1980 | Japan ............................. 340/384 E |

Primary Examiner—Joseph A. Orsino
Assistant Examiner—Brian R. Tumm
Attorney, Agent, or Firm—Cushman, Darby & Cushman

[57] ABSTRACT

A horn circuit for an automotive vehicle features a transistor amplifying circuit which functions to amplify an output current of a horn switch. With the help of this transistor amplifying circuit, the horn switch makes the horn circuit operative in order to actuate the horn, regardless of depressive strength applied to the switch operation. A diaphragm or membrane switch which is a small current type is usable, whereby a low-cost and highly reliable horn circuit for the automotive vehicle is realized.

9 Claims, 12 Drawing Sheets

HORN FOR AN AUTOMOTIVE VEHICLE

BACKGROUND OF THE INVENTION

1. Field of the Invention

This invention relates to a horn means for an automotive vehicle, and more particularly to the horn means which comprises a highly reliable horn switch assembly.

2. Description of the Prior Art

In a conventional horn means for an automotive vehicle, a horn switch is generally provided on a pad portion in the steering wheel structure, while a horn which generates a warning sound is provided on a vehicle body. Each of FIGS. 17 and 18 of the drawings shows a block diagram of the conventional horn means. The horn means shown in FIG. 17 comprises a horn switch 1 one end of which is earthed to the vehicle body through a handle shaft, a horn 3 one end of which is connected to a high level power source Vcc, a contact ring means 2 having a contact ring 21 connected to the other end of the horn switch and a contact pin 26 connected to the other end of the horn 3. The electric current of several hundreds mA flows from the source Vcc to the earth through the horn 3, the contact ring means 2 and the horn switch 1.

In the horn means shown in FIG. 18, a relay 4 is provided between the contact pin 26 and the high level power source Vcc. The horn 3 is actuated by a normally OFF contact point 41 of the relay 4. In case of this known art, an electric current of several hundreds mA flows between the horn switch 1 and the contact ring 21. That is, according to these prior arts, in either case, the horn switch 1 is arranged to actuate the horn 3 through the contact ring 21.

According to the experiments, these conventional horn means have the following drawbacks. When a membrane switch having a high on-state resistance was used as the horn switch 1, it has been observed that a voltage drop was produced, by which the relay 4 often became inoperative or the sound of the horn 3 too low. Also, when a diaphragm switch which has a very low on-state resistance and current capacity was used, life of the contact point 41 was extremely shortened upon application of the current of several hundreds mA.

SUMMARY OF THE INVENTION

An object of this invention is, therefore, to provide a low-cost and highly reliable horn means for an automotive vehicle.

The horn means for an automotive vehicle of the present invention comprises a horn circuit including a horn provided on a vehicle body, a horn switch provided on a steering wheel to actuate the horn, a contact ring and a contact pin both of which combine to connect the horn circuit to the horn switch, and features a provision of transistor amplifying circuit which functions to amplify the output current of the horn switch to make the horn circuit operative. As for the horn switch, it is preferable to use a membrane or a diaphragm type switch through which a very small amount of current flows. The horn circuit may incorporate a relay which is operatively connected to the horn.

The above-mentioned transistor amplifying circuit serves to amplify the output current of the horn switch (this switch is preferably of a small current membrane type) and may include a bipolar transistor or a field effect transistor like MOS power transistors.

With this structure, the operation of the horn means of this invention is as follows: when the horn switch on the steering wheel is set to ON, its output current is amplified by the transistor amplifying circuit. Thus, the horn circuit comes to be operative and actuates the horn.

An advantage of this invention is that the horn can be actuated without fail even when an output resistance of the horn switch becomes so large because of defective contact in the horn switch, insufficient depression of the horn switch or the like.

Another advantage of this invention is that the horn switch can be operated by a push over any portion on the pad in the steering wheel since a switch, like a membrane switch which has a wide operative area, is useable.

DESCRIPTION OF THE PREFERRED EMBODIMENTS

Figure 1:
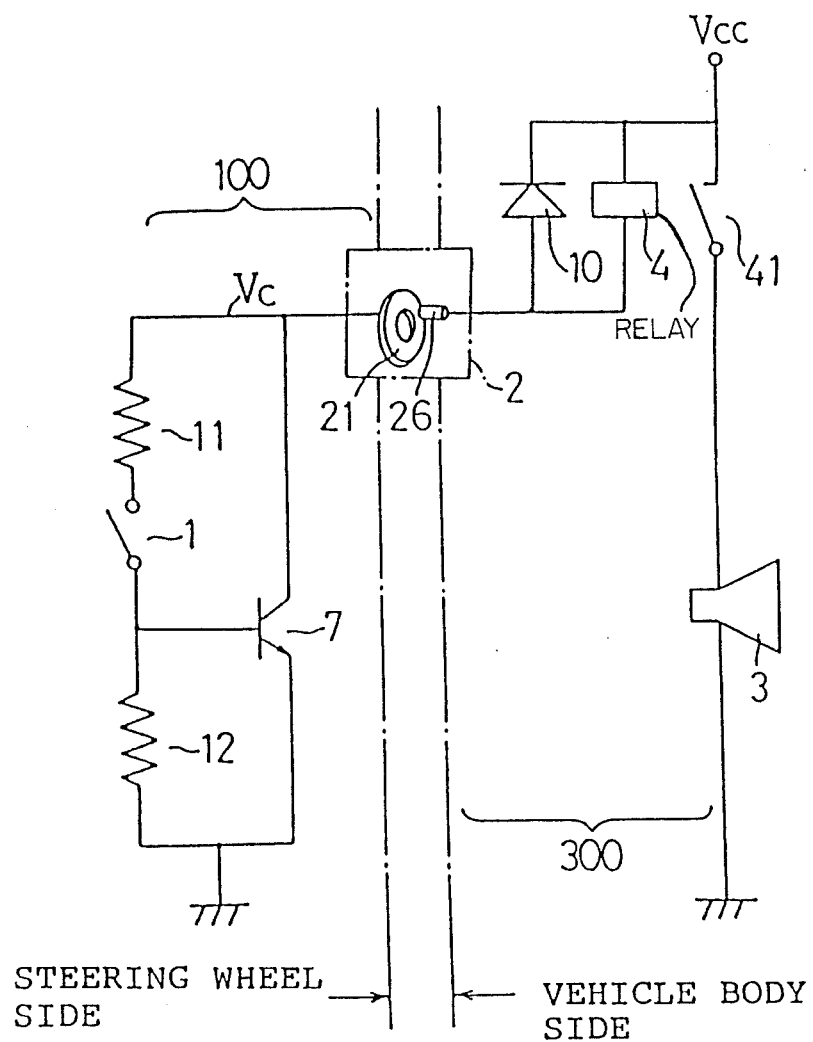
FIG. 1 is a circuit diagram having a transistor amplifying circuit according to the first embodiment of the horn means for an automotive vehicle of the present invention.

Various other objects, features and attendant advantages of the present invention will be more fully appreciated as the same becomes better understood from the following detailed description when considered in connection with the accompanying drawings.

Referring now to the drawing, in which like reference numerals designate identical or corresponding parts throughout the drawings.

FIG. 1 shows the first embodiment of the present invention, wherein a horn means for an automotive vehicle comprises a horn circuit 300 provided on a vehicle body, a transistor amplifying circuit 100 including a horn switch 1, a transistor 7 and resistors 11, 12, and a contact ring means 2 all of which are provided in a steering wheel. The contact ring means 2 has a contact ring 21 and a contact pin 26 to connect electrically the transistor amplifying circuit 100 to the horn circuit 300.

Included in the horn circuit 300 are a relay 4 and a diode 10 connected between one terminal of the contact ring means 2 and a high level power source Vcc, and a horn 3, one end of which is connected to the power source Vcc and the other end of which is earthed.

As for transistor amplifying circuit 100, the emitter of the transistor 7 is earthed with its collector connected to the other end of the contact ring means 2, the base of which being connected to the collector through the resistor 11 and the horn switch 1 and earthed through the resistor 12. Further, the transistor amplifying circuit 100 is connected through a steering shaft of the steering wheel to the earthed end of the vehicle body. As for the resistor 11 (resistance value is R11), it is possible to use an on-state resistor and a LINE resistor on a base plate.

Figure 7:
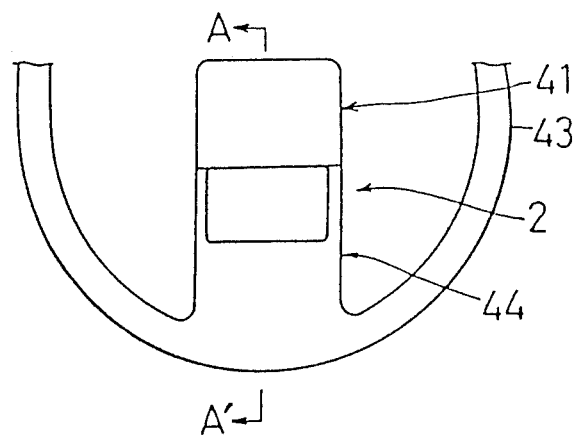
FIG. 7 is a plan view of a steering wheel for a vehicle which incorporates the horn means of the present invention.
Figure 8:
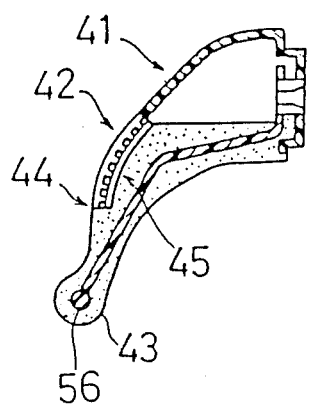
FIG. 8 is a sectional view taken along the c line A—A' of FIG. 7.
Figure 9:
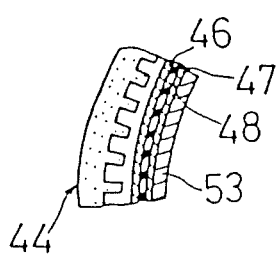
FIG. 9 is a sectional view taken on an enlarged scale of the steering wheel shown in FIG. 8.

Detailed construction of the horn switch 1 is described in conjunction with FIGS. 7-9, wherein a flexible membrane switch 45 as the horn switch is used and has the shape of a membrane. The flexible membrane switch 45 can be deformed when any portion of an area 42 is depressed. The membrane switch 45 and the associated wiring (not shown) are mounted integrally on the base plate 53 as shown in FIGS. 8 and 9.

That is, the flexible membrane switch 45 is composed of a first flexible electrode plate 46, a second flexible electrode plate 47 and an insulated spacer film 48 sandwiched therebetween. Each of the first and second electrode plates 46 and 47 are made of conductive film. The material of the conductive film may be a copper leaf or an aluminum leaf. The insulated spacer film 48 is made of polyester or polyimide material. The insulated spacer film 48 has a number of through holes provided at adequate intervals.

The operation of the horn means in FIG. 1 will now be described hereinafter.

When the horn switch 1 is set to ON, the base current of the transistor 7 flows, which is followed by the flow of collector current as much as a current amplification rate (xhfe). Thus, a coil of the relay 4 is energized. When the collector voltage Vc decreases by the voltage drop produced at the relay 4, the base and collector current in the transistors are decreased. This eventually results in the development of a given voltage at the collector of the transistor 7, which is determined by the resistance values R11 and R12 of bias resistors 11, 12 and DC resistance RL of the coil of the relay 4.

If the applied voltage (VL=Vcc−Vc) of the relay 4 is more than 75% of the rating voltage, the relay 4 becomes ON and the current point 41 is closed, thus a warning sound is generated from the horn 3.

If the horn switch 1 is set to OFF, a transistor 7 becomes nonconductive, the relay 4 is shut off and the contact point 41 is opened. In this state, the horn 3 is not actuated.

The diode 10 functions to bypass a magnetic energy of the relay 4 when the relay 4 is in an OFF state. As an alternative, a resistor may be used instead of this diode. Further, if the withstand voltage at collector of the transistor 7 is used, the diode may be omitted.

According to this first embodiment, Vcc was set to 12V, R11 to 1K ohm, R12 to 10K ohm and coil resistance RL of the horn 3 to approx. 2 ohm, respectively.

To go back to FIGS. 7-9 when the surface of the membrane switch 45 is depressed, the first electrode plate 46 and the second electrode plate 47 are electrically connected by contacting each other. Thus, the second electrode plate 47 is connected to the core bar 56 built in the steering wheel. The core bar 56 is earthed to the vehicle body. By means of this connection, the horn 3 is actuated.

Figure 2:
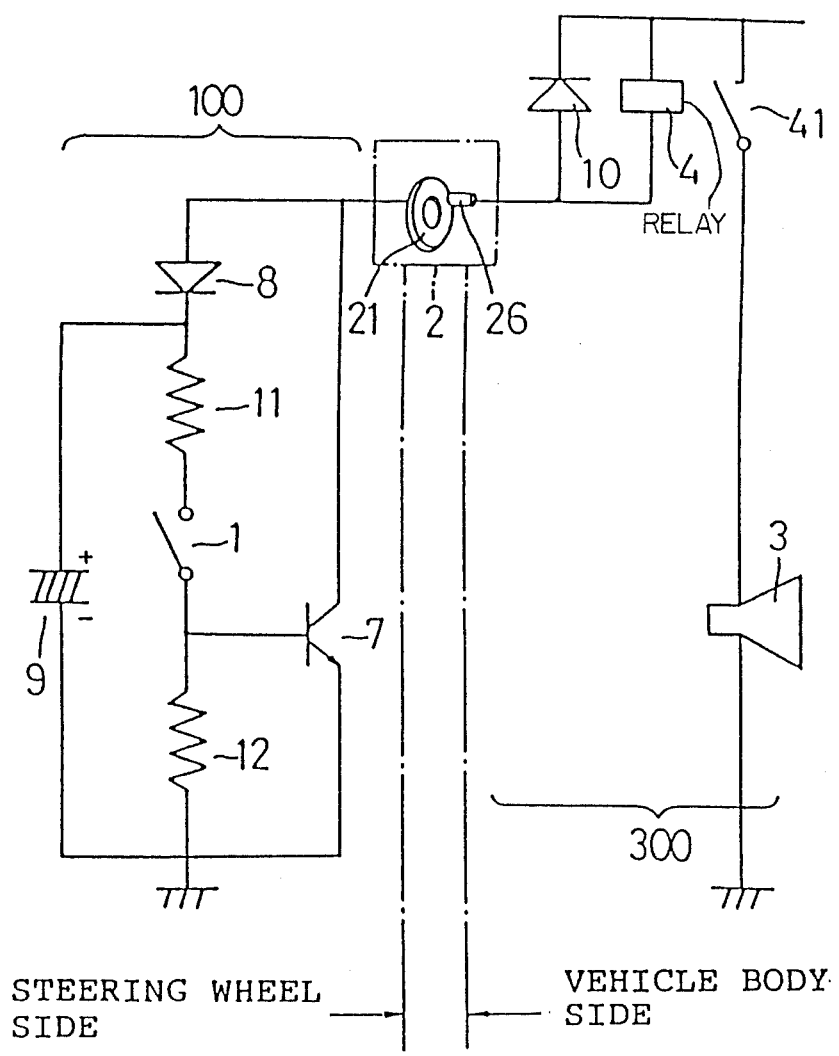
FIG. 2 is a circuit diagram having another transistor amplifying circuit according to the second embodiment of the horn means for an automotive vehicle of the present invention.

Referring to FIG. 2 which shows the second embodiment of this invention, the horn means according to this embodiment is similar to that shown in FIG. 1 except that there is provided with a diode 8 between the collector of the transistor 7 and bias resistor 11, and that the connecting point of the bias resistor 11 and diode 8 is earthed through the condenser 9.

The operation of this second embodiment is basically similar to that in FIG. 1. In this arrangement, when the horn switch 1 is set to ON, the discharge current of condenser 9 flows to the bias resistor 12 and the base of the transistor 7 to make the relay 4 to be in an ON state. In this case, the diode 8 functions to prevent the discharge current from being absorbed by the collector.

Figure 3:
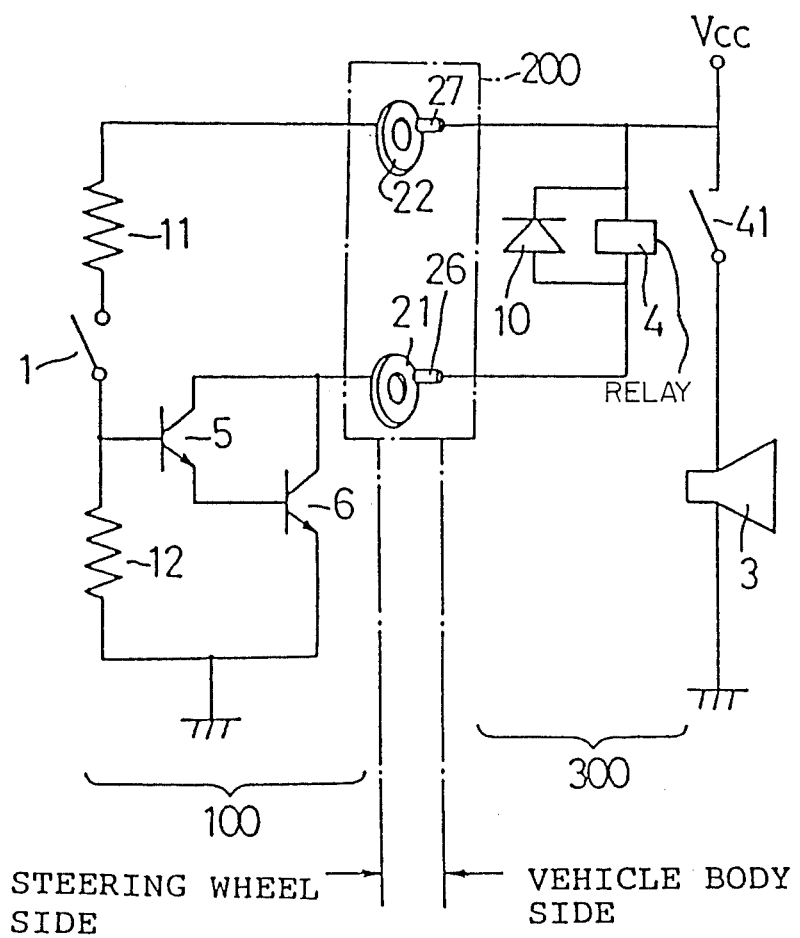
FIG. 3 is a circuit diagram having a further transistor amplifying circuit according to the third embodiment of the horn means for an automotive vehicle of the present invention.

Referring to FIG. 3 which shows the third embodiment of this invention, the horn means for an automotive vehicle employed in this embodiment is principally similar to that in FIG. 1. But, different from the embodiment in FIG. 1, there are provided transistors 5 and 6 which are connected to form a Darlington circuit; and instead of the contact ring means 2 in FIG. 1, a contact ring means 200 is provided.

The contact ring means 200 is provided with the second contact ring 22 and contact pin 27 in addition to the contact ring 21 and contact pin 26. Transistors 5 and 6 in a Darlington circuit are adapted to actuate the relay 4 through the contact ring means 200. Collectors of both transistors 5 and 6 are connected to the contact ring 21, while emitter of the transistor 6 is earthed and base of the transistor 5 is connected to the horn switch 1 and the resistor 12.

The bias resistor 11 is connected to a high level power source Vcc on a vehicle body through the contact ring 22 and contact pin 27.

According to this embodiment, as transistors 5 and 6 are connected in a Darlington circuit, the base current flowing to the horn switch 1 is 1/(hfe 1×hfe 2) of the coil current of the relay 4. This serves to improve the current capacity and the life of contact of the horn switch 1.

Figure 4:
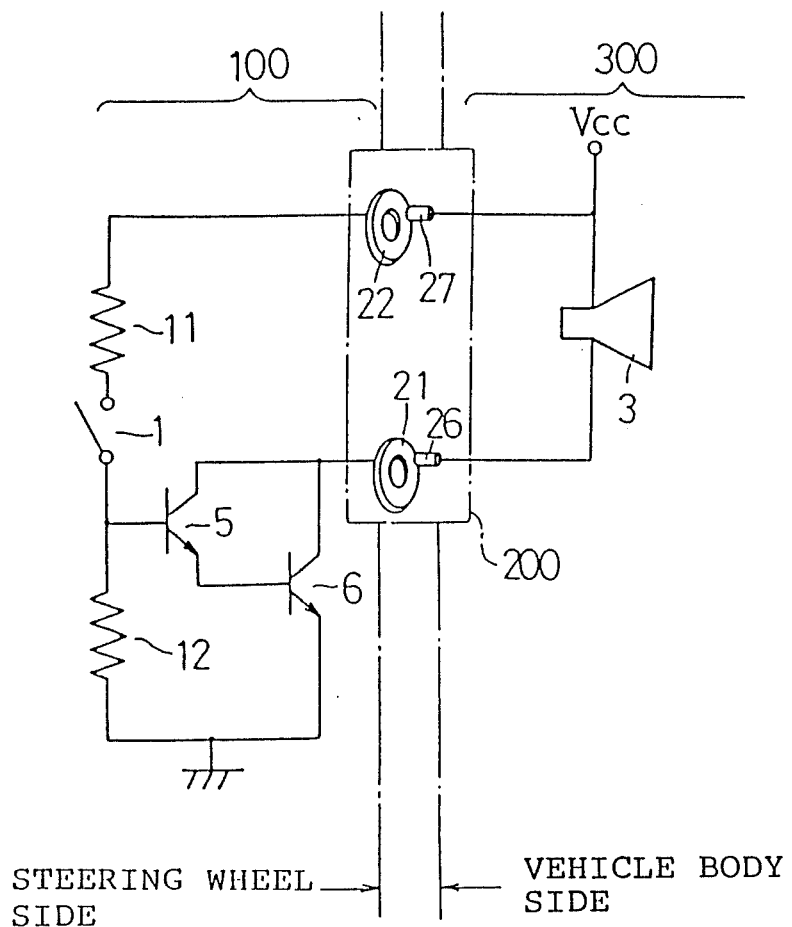
FIG. 4 is a circuit diagram having an even further transistor amplifying circuit according to the fourth embodiment of the horn means for an automotive vehicle of the present invention.

Referring to FIG. 4 which shows the fourth embodiment of this invention, the horn means according to this embodiment is similar to that in FIG. 3. That is, in this embodiment, the relay 4 and diode 10 in FIG. 3 are both omitted. Accordingly, the horn 3 is directly actuated by transistors 5 and 6 through the contact ring means 200.

In the case of this embodiment, the wiring arrangement is simplified and therefore brings about a lower cost. The resistance voltage of the horn switch 1 is negligibly as small as in the embodiment shown in FIG. 1.

Figure 5:
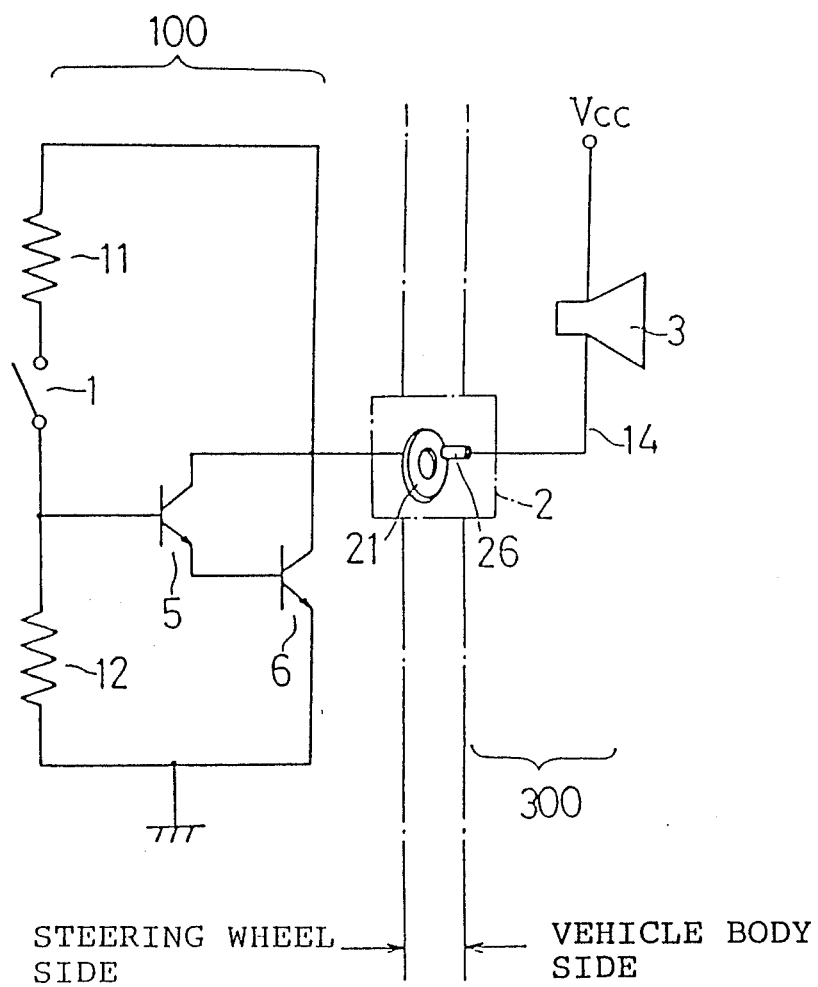
FIG. 5 is a circuit diagram having still another transistor amplifying circuit according to the fifth embodiment of the horn means for an automotive vehicle of the present invention.

FIG. 5 shows the fifth embodiment of this invention. In the case of this embodiment, the contact ring 22 in FIG. 4 is omitted and one end of the bias resistor 11 is connected to the collectors of transistors 5 and 6. The operation of this fifth embodiment is as follows: when the horn switch 1 is set to ON, transistors 5 and 6 become conductive. To the horn 3, a voltage which is determined by the product of the resistance of the horn 3, bias resistors 11 and 12 and current amplifying ratio (hfe 1, hfe 2) of the transistors 5 and 6 is applied.

For example, the horn resistor is set to 1.5 ohm and bias resistors 11 and 12 are set to 12K ohm respectively.

Assuming that the current amplification ratio of each of transistors 5 and 6 is set to 250 (hfe 1, hfe 2), respectively, and that the horn current is set to 0.25A, base current of the transistor 5 becomes 0.1 mA. This means that even if ON resistance of the horn switch is high, the voltage drop can be negligible, which assures actuation of the horn 3.

Figure 6:
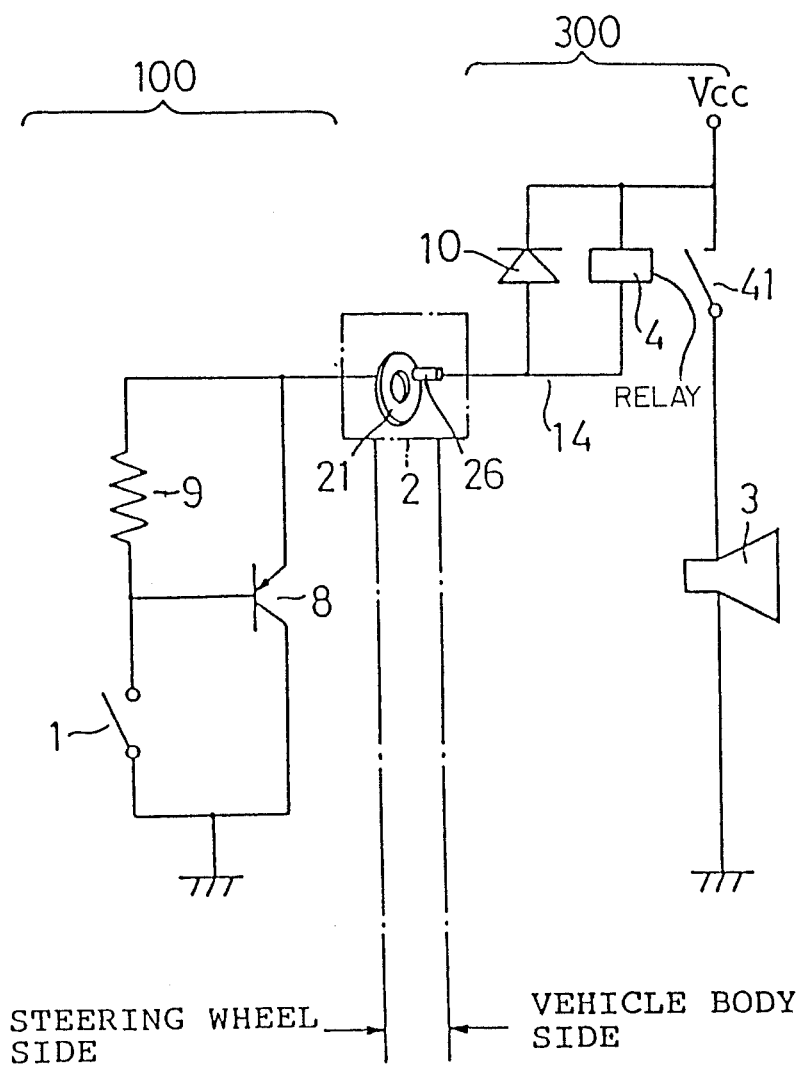
FIG. 6 is a circuit diagram having yet another transistor amplifying circuit according to the sixth embodiment of the horn means for an automotive vehicle of the present invention.

FIG. 6 shows the sixth embodiment of this invention. The horn means in this embodiment comprises a horn switch 1, a transistor amplification circuit 100, a contact ring means 2 and a horn circuit 300.

The transistor amplification circuit 100 is an emitter follower circuit to actuate relay 4 through the contact ring means 2 and has PNP emitter follower transistor 8 of which collector is earthed, a base resistor 9 which connects base and collector of the PNP emitter follower transistor 8 is earthed through the horn switch 1 and at the same time is connected to the contact ring means 2 through the base resistor 9.

The operation of this embodiment is as follows: when the horn switch 1 is opened, potential between the emitter follower transistor 8 is identical and the relay 4 is turned OFF. When the horn switch 1 is closed, the transistor 8 makes the relay 4 turn ON and the horn 3 is actuated.

According to this embodiment, when the relay 4 is turned ON, the potential on the lines 14 becomes about +0.75V. Thus, voltage efficiency of the relay 4 is improved. The base resistor 9, is set, for example, to 10K ohm which hardly increases the current of the horn switch 1. Instead of the emitter follower transistor 8, it is possible to connect a plurality of emitter-follower transistors in a Darlington circuit, and further, to omit the relay 4 to actuate directly the horn as shown in FIG. 4.

Figure 10:
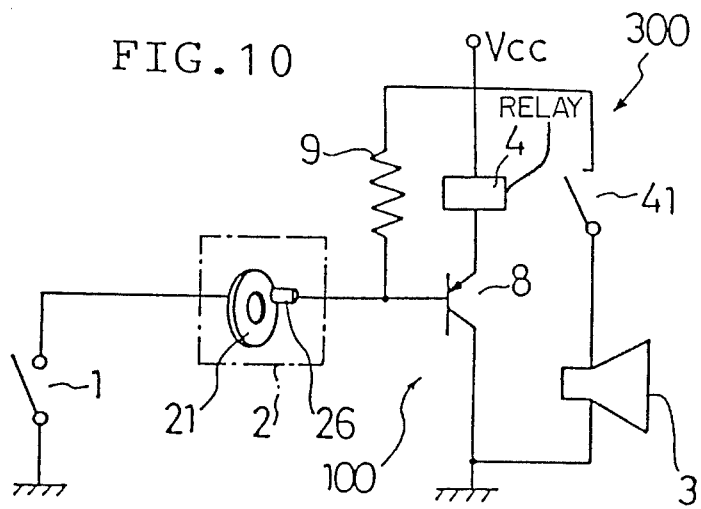
FIG. 10 is a circuit diagram having another transistor amplifying circuit according to the seventh embodiment of the horn means for an automotive vehicle of the present invention.

FIG. 10 shows the seventh embodiment of this invention. The horn means in this embodiment comprises, a horn switch 1, a contact ring means 2, a transistor amplifying circuit 100 and a horn circuit 300. Except that the transistor amplifying circuit 100 is provided on a body of a vehicle, the rest of the construction is the same as in FIG. 6. The transistor amplifying circuit 100 is in the form of an emitter follower circuit and comprises PNP transistor 8 and a resistor 9 which connects the base and collector of the PNP transistor 8. The horn circuit 300 is composed of a relay 4 to be actuated by the emitter of the transistor 8 and a horn 3 is to be actuated by a normally OFF contact point 41 of the relay 4.

In this arrangement, when the horn switch 1 is closed, the transistor 8 actuates the relay 4 which, in turn, actuates the horn 3. When the horn switch 1 is opened, the base of the transistor 8 is changed by a high level power source Vcc through the resistor 9. As a result, the transistor 8 becomes nonconductive and relay 4 is turned OFF. The horn 3 does not sound.

In accordance with this embodiment, current capacity of each of the contact ring means 2 and horn switch 1 can be made very small; and consequently, only a pair of contact rings 2 are required.

Figure 11:
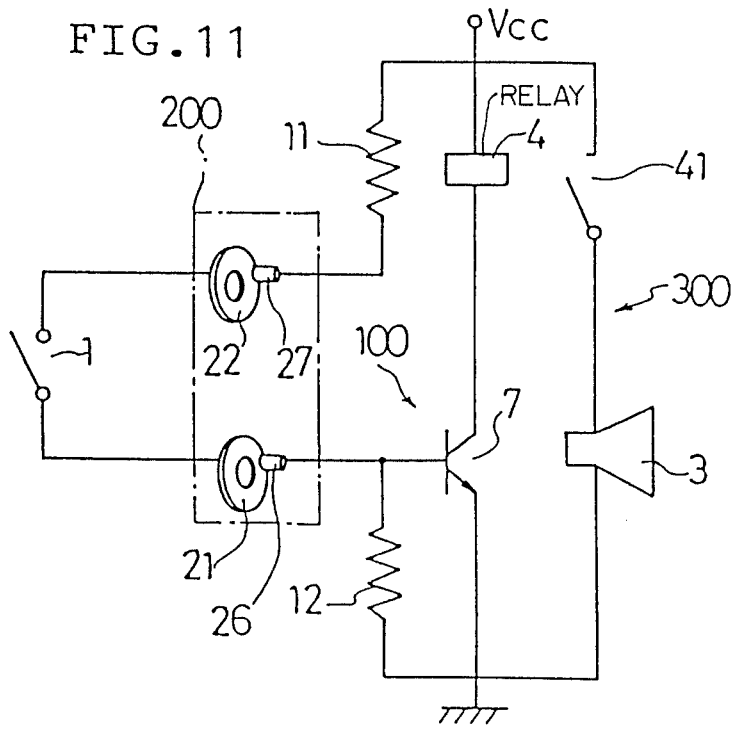
FIG. 11 is a circuit diagram having a further transistor amplifying circuit according to the eighth embodiment of the horn means for an automotive vehicle of the present invention.

FIG. 11 shows the eighth embodiment of this invention.

The horn means in accordance with this invention comprises a horn switch 1, a contact ring means 200, a transistor amplifying circuit 100 and a horn circuit 300. This arrangement is different from the seventh embodiment in that an emitter earthed amplifier is used as a transistor amplifying circuit 100. The transistor amplifying circuit 100 comprises a NPN transistor 7, with its emitter earthed, a discharge resistor 12 connecting the base of the NPN transistor 7 and a charging resistor 11 with the earth. The charging resistor 11 serves to charge the base of the NPN transistor 7 through the contact ring means 200 and the horn switch 1.

In this embodiment, when the horn switch 1 is closed, the transistor 7 becomes conductive and actuates the relay 4 which in turn actuates the horn 3. When the horn switch 1 is opened, the base of the transistor 7 is earthed by the resistor 12. Thus, the transistor 8 and relay 4 are turned OFF, and the sounding of the horn 3 is stopped.

Figure 12:
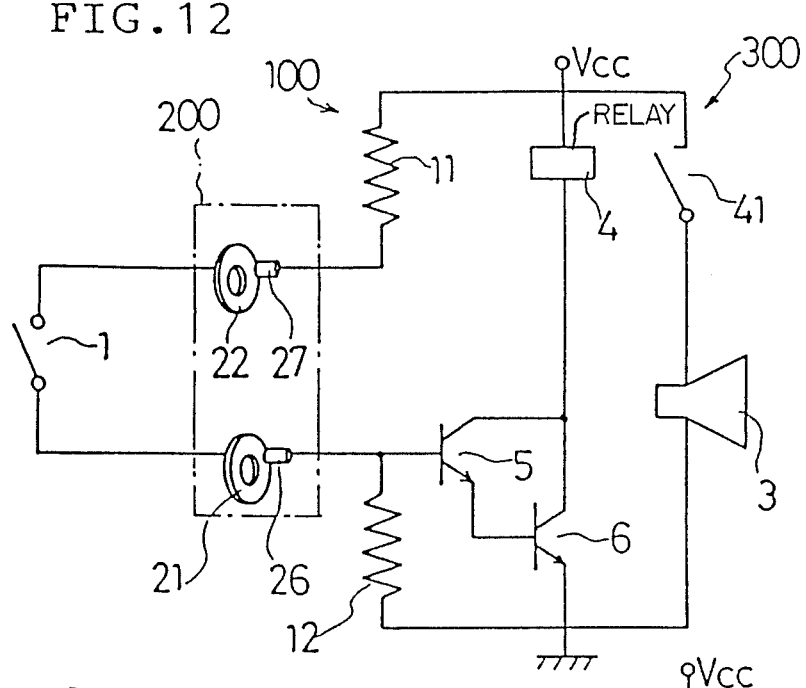
FIG. 12 is a circuit diagram having an even further transistor amplifying circuit according to the ninth embodiment of the horn means for an automotive vehicle of the present invention.

FIG. 12 shows the ninth embodiment of this invention.

The horn means in accordance with this invention comprises a horn switch 1, a contact ring means 200, a transistor amplifying circuit 100 and a horn circuit 300. That is, in this invention, transistors 5 and 6 connected in a Darlington circuit are employed in place of the transistor 7 in FIG. 11.

Figure 17:
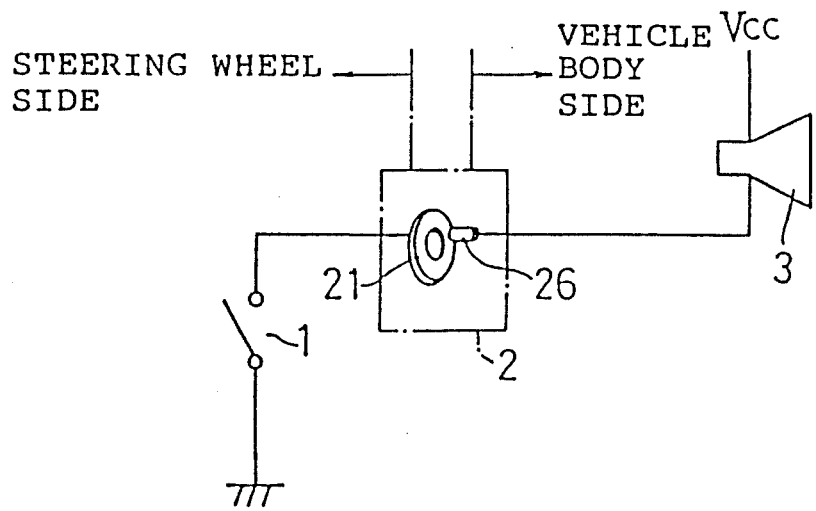
FIG. 17 is a circuit diagram of the conventional horn means for an automotive vehicle.
Figure 18:
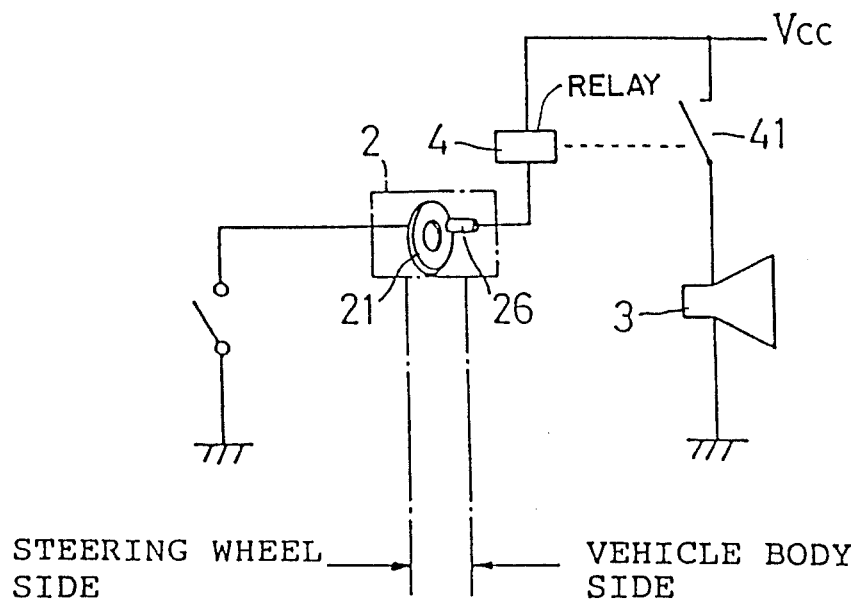
FIG. 18 is circuit diagram which is analogous to FIG. 17.

The operation of this embodiment is basically identical with that shown in FIG. 17, but this embodiment enables it to drastically decrease the current (ex. 1 μA) flowing to the horn switch 1 and contact ring means 200 because of the use of a Darlington circuit type amplifier.

Figure 13:
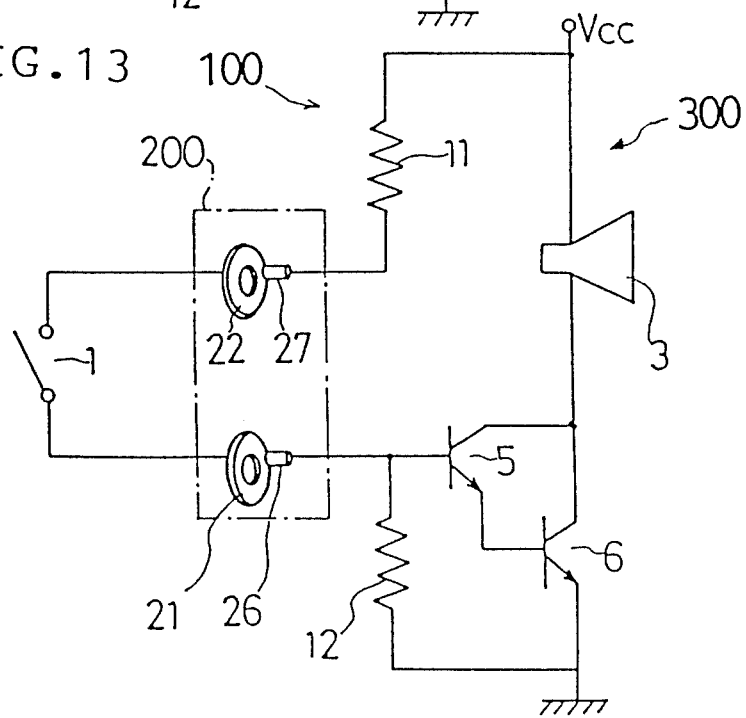
FIG. 13 is a circuit diagram having still another transistor amplifying circuit according to the tenth embodiment of the horn means for an automotive vehicle of the present invention.

FIG. 13 shows the tenth embodiment of this invention.

The horn means comprises a horn means 1, a contact ring means 200, a transistor amplifying circuit 100 and a horn circuit 300. In this embodiment, the horn 3 is actuated directly by the collector of each of the transistors 5 and 6 connected in a Darlington circuit being different from the embodiment in FIG. 12. Accordingly, the horn circuit 300 is composed only of the horn 3. The operation of this embodiment is identical with that shown in FIG. 12. But, in the case of this embodiment, the relay 4 is omitted, which results in improving reliability and decreasing the product cost.

Figure 14:
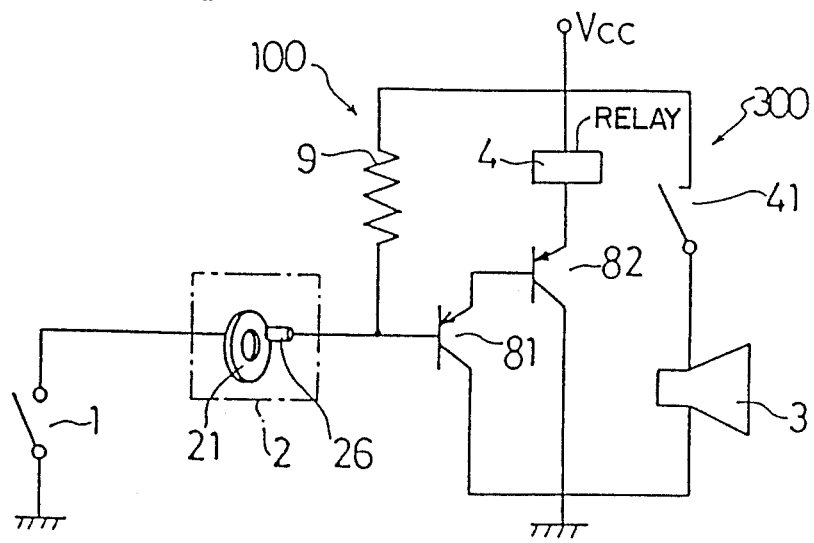
FIG. 14 is a circuit diagram having yet another transistor amplifying circuit according to the eleventh embodiment of the horn means for an automotive vehicle of the present invention.

FIG. 14 shows the eleventh embodiment of this invention.

The horn means comprises a horn switch 1, a contact ring 2, a transistor amplifying circuit 100 and a horn circuit 300. The construction is the same as that shown in FIG. 10, except that transistors 81 and 82 in a Darlington circuit connection are used instead of a transistor 8. By using a Darlington circuit type amplifier, a current flowing to the horn switch 1 and contact ring means 200 is drastically decreased (ex., 1 μA) as compared with the embodiment in FIG. 10. In addition, in case of this embodiment, the construction of contact ring means may be simplified or even omitted compared with the embodiments shown in FIGS. 12 and 13.

Figure 15:
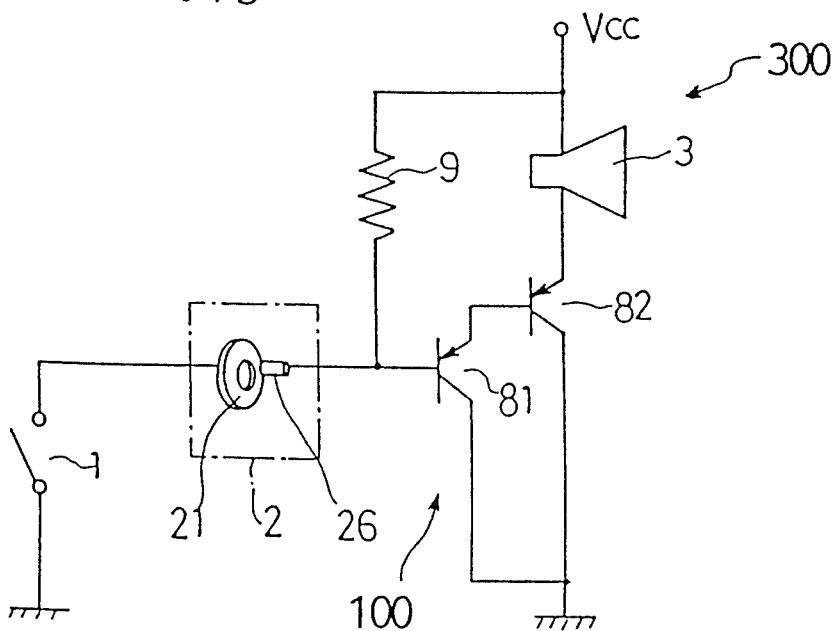
FIG. 15 is a circuit diagram having a further transistor amplifying circuit according to the twelfth embodiment of the horn means for an automotive vehicle of the present invention.

FIG. 15 shows the twelfth embodiment of this invention.

The horn means for the automotive vehicle comprises a horn switch 1, a contact ring means 2, a transistor amplifying circuit 100 and a horn circuit 300.

The collectors of transistors 81 and 82 are connected in a Darlington arrangement and directly actuate the horn 3. Accordingly, the horn circuit 300 is composed only of a horn 3. Except that the horn 3 is directly actuated by the transistors 81 and 82, the remaining operation is identical with that shown in FIG. 14.

In this embodiment, the relay 4 is also omitted, which can lead to improve reliability and production cost.

Figure 16:
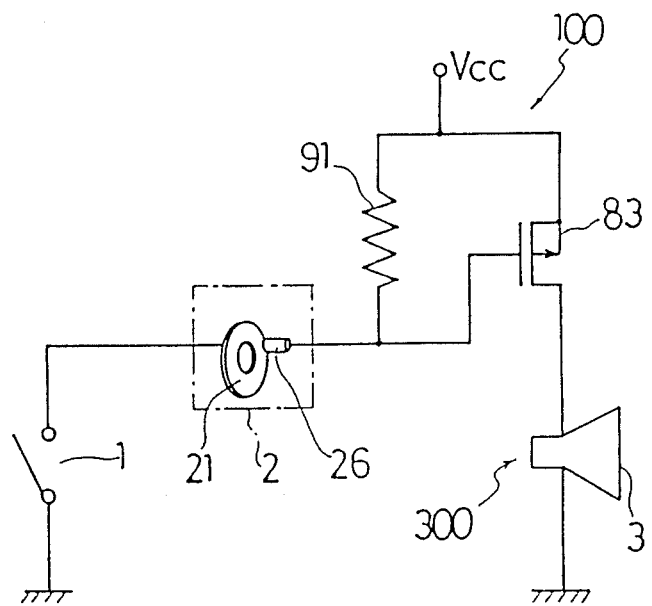
FIG. 16 is a circuit diagram having still further transistor amplifying circuit according to the thirteenth embodiment of the horn means for an automotive vehicle of the present invention.

FIG. 16 shows the thirteenth embodiment of this invention.

The horn means for an automotive vehicle comprises a horn switch 1, a contact ring means 2, a transistor amplifying circuit 100 and a horn circuit 300. As compared with the embodiment in FIG. 15, a transistor amplification circuit 100 has a P channel power MOS transistor 83 instead of transistors 81 and 82 in a Darlington circuit. The P channel power MOS transistor 83 has a gate connected to one end of the horn switch 1, a source connected to a high level power source Vcc, and a drain to actuate the horn 3. The horn circuit 300 is composed only of the horn 3.

In the operation of this embodiment, if the horn switch 1 is closed, MOS transistor 83 is turned ON and actuates the horn 3. If the horn switch 1 is opened, MOS transistor 83 is turned OFF and the horn 3 is not actuated. In the case of this arrangement, the current capacity of the horn switch 1 and a contact ring means 2 can be greatly decreased by shifting the gate charging resistor 91 to high.

As thus described, in accordance with the embodiments of the present invention, it is possible to decrease drastically the current flowing to the horn switch and contact ring means. (For example, the current may be decreased to less than 1 mA.) Thus, the compactibility, reliability and eventually the life of these components are greatly imposed.

Even if the contact resistance of the horn switch 1 and contact ring means 2 should be increased, the horn 3 can be actuated as far as a small base current is supplied to the transistor amplification circuit 100.

Further, a membrane switch or the like can be used as a horn switch 1, and the depressible area on the horn switch is designed to be wide.

In each of the above described embodiments, it is possible to use a conductive type transistor, or a field effect transistor (FET). It goes without saying that if the conductive type transistor is employed, it is necessary to reverse the wiring.

What is claimed is:

1. A horn means for an automotive vehicle having a vehicle body comprising:
   a horn circuit having a horn, the horn circuit being provided on the vehicle body, the body having a steering wheel;
   a transistor amplifying circuit mounted in the steering wheel and having a horn switch which conducts current when closed, the transistor amplifying circuit comprising a transistor for amplifying the current flowing through the horn switch; and
   a contact ring and a contact pin, which connect said transistor amplifying circuit to said horn circuit.

2. A horn means for an automotive vehicle according to claim 1, wherein said horn circuit comprises only one pair of said contact ring and said contact pin.

3. A horn means for an automotive vehicle according to claim 2, wherein said transistor of said transistor amplifying circuit has a collector connected to said contact ring, an emitter connected to said vehicle body and a base connected to said horn switch.

4. A horn means for an automotive vehicle according to claim 2, wherein said transistor of said transistor amplifying circuit has an emitter connected to said contact ring, a collector connected to said vehicle body and a base connected to said horn switch.

5. A horn means for an automotive vehicle according to claim 2, wherein said transistor amplifying circuit comprises transistors connected in a Darlington arrangement which have collectors connected to said contact ring, an emitter connected to said vehicle body and a base connected to said horn switch.

6. A horn means for an automotive vehicle according to claim 1, wherein said horn switch consists of a membrane switch.

7. A horn means for an automotive vehicle according to claim 1, wherein said transistor of said transistor amplifying circuit has a collector connected to said contact ring, an emitter connected to said vehicle body and a base connected to said horn switch.

8. A horn means for an automotive vehicle according to claim 1, wherein said transistor of said transistor amplifying circuit has an emitter connected to said contact ring, a collector connected to said vehicle body and a base connected to said horn switch.

9. A horn means for an automotive vehicle according to claim 1, wherein said transistor amplifying circuit comprises transistors connected in a Darlington arrangement which have collectors connected to said contact ring, an emitter connected to said vehicle body and a base connected to said horn switch.

* * * * *